(12) United States Patent
Wiker et al.

(10) Patent No.: US 7,732,954 B2
(45) Date of Patent: Jun. 8, 2010

(54) ELECTRICAL MACHINE

(75) Inventors: Juergen Wiker, Hangzhou/Bing Jiang District (CN); Ralph Dammertz, Mt. Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/671,717

(22) Filed: Feb. 6, 2007

(65) Prior Publication Data

US 2007/0241624 A1 Oct. 18, 2007

(30) Foreign Application Priority Data

Mar. 29, 2006 (DE) ............ 10 2006 014 499

(51) Int. Cl.
*H02K 9/06* (2006.01)
(52) U.S. Cl. .................. 310/60 R; 310/61
(58) Field of Classification Search ........... 310/60 R, 310/58, 61
See application file for complete search history.

(56) References Cited

U.S. PATENT DOCUMENTS

| 2,729,758 | A | * | 1/1956 | Knapp | 310/59 |
|---|---|---|---|---|---|
| 3,119,942 | A | * | 1/1964 | Luther | 173/171 |
| 3,213,307 | A | * | 10/1965 | Summerfield | 310/234 |
| 3,367,687 | A | * | 2/1968 | Jenkins | 403/261 |
| 3,694,680 | A | * | 9/1972 | Jacyno | 310/50 |
| 3,824,684 | A | * | 7/1974 | Wheeler | 29/596 |
| 4,083,735 | A | * | 4/1978 | Caramanian | 156/64 |
| 4,800,315 | A | * | 1/1989 | Schulz et al. | 310/261 |
| 5,361,853 | A | * | 11/1994 | Takamura et al. | 173/217 |
| 5,731,651 | A | * | 3/1998 | Hyodo | 310/261 |
| 6,137,205 | A | * | 10/2000 | Hung et al. | 310/261 |
| 6,320,286 | B1 | * | 11/2001 | Ramarathnam | 310/50 |
| 6,448,683 | B2 | * | 9/2002 | Wiesler et al. | 310/235 |
| 7,096,566 | B2 | * | 8/2006 | Du et al. | 29/596 |
| 7,215,048 | B2 | * | 5/2007 | Du et al. | 310/43 |
| 2004/0056539 | A1 | | 3/2004 | Du | |

FOREIGN PATENT DOCUMENTS

| DE | 2 312 334 | | 9/1974 |
|---|---|---|---|
| DE | 102 56 805 | | 6/2004 |
| DE | 10256805 | A1 * | 6/2004 |
| EP | 0 261 306 | | 3/1988 |
| GB | 2 021 330 | | 11/1979 |
| GB | 2021330 | A * | 11/1979 |
| JP | 57-110048 | | 7/1982 |
| JP | 2004-266925 | | 9/2004 |
| KR | 10-2004-0059944 | | 7/2004 |

* cited by examiner

*Primary Examiner*—Quyen Leung
*Assistant Examiner*—Naishadh N Desai
(74) *Attorney, Agent, or Firm*—Michael J. Striker

(57) ABSTRACT

An electrical machine has an armature with armature grooves for accommodating an armature winding and which is non-rotatably supported on an armature shaft, wherein at least one heat-conducting element is provided in the region of at least one end face of the armature.

7 Claims, 3 Drawing Sheets

ELECTRICAL MACHINE

CROSS-REFERENCE TO A RELATED APPLICATION

The invention described and claimed hereinbelow is also described in German Patent Application DE 102006014499.6 filed on Mar. 29, 2006. This German Patent Application, whose subject matter is incorporated here by reference, provides the basis for a claim of priority of invention under 35 U.S.C. 119(a)-(d).

BACKGROUND OF THE INVENTION

The present invention relates to an electrical machine, in particular a universal motor.

Universal motors are used widely, e.g, in power tools. Since, with universal motors, electric current flows through the armature winding and the excitation winding, a great deal of heat is produced, which gradually heats up the entire motor. To prevent damage that could be caused by the motor heating up, it must be ensured that the motor is cooled adequately. With power tools, air is drawn in from the outside, e.g., through a fan wheel, for cooling, as described, e.g., in DE 102 56 805 A. The fan wheel is mounted non-rotatably on the armature shaft between the armature and gearbox. When the fan wheel rotates, it generates an air flow which flows axially through the power tool and carries heat to the outside.

To achieve good cooling, as much as air as possible must be transported through the power tool. High air throughput means a high flow rate, however, which can be associated with undesired fan noises under certain circumstances. In addition, when the cooling air flows through the power tool, it only passes over the surface of the armature and the stator. With universal motors with a small armature diameter in particular, the surface of the armature and the stator is correspondingly small, so that a relatively small amount of heat can be given off to the cooling air by the armature and the stator. Cooling using a fan wheel is therefore inadequate.

SUMMARY OF THE INVENTION

Accordingly, it is an object of the present invention to provide an electrical machine, which is a further improvement of the existing electrical machines.

In keeping with these objects and with others which will become apparent hereinafter, one feature of the present invention resides, briefly stated, in an electrical machine, comprising an armature shaft; an armature winding; an armature provided with armature grooves for accommodating said armature windings and non-rotatably supported on said armature shaft; and at least one heat-conducting element provided in a region of at least one end face of said armature.

The electrical machine according to the present invention has the advantage that more heat is given off by the armature, since its surface is larger due to at least one heat-conducting element which is located at least in the region of one of the two end faces of the armature. The heat-conducting element has the function of carrying heat away from the armature. The heat-conducting element is therefore made of a thermally conductive material, in particular a metal, e.g., aluminum or sheet steel, and it is connected with the armature in a thermally conductive manner. According to the present invention, a single heat-conducting element or several heat-conducting elements are provided. A heat-conducting element can be located on the end face of the armature facing the commutator and/or on the end face diametrically opposed thereto.

The thermally conductive connection of a heat-conducting element with the armature can take place via bonding using a thermally conductive material. The thermally Conductive material for the bonded connection can be, e.g., a thermally conductive adhesive mass or resin.

In addition or as an alternative thereto, to provide a thermally conductive connection, the armature can include recesses in which the heat-conducting element engages. The armature is typically composed of an armature laminated core with armature grooves formed between adjacent armature teeth. The armature also has a central opening for accommodating an armature shaft. Recesses provided for engagement of the heat-conducting element in the armature can be, e.g., bore holes near the armature teeth, e.g., in the tooth shafts or tooth crests.

In a further alternative embodiment, the heat-conducting element engages in the armature grooves. The heat-conducting element can be inserted, e.g., before the armature winding is wound in the armature grooves. The heat-conducting element can also be inserted in the armature grooves before the armature winding is wound, e.g., in that it engages in the armature grooves in the manner of a slot wedge.

In a first embodiment, the heat-conducting element is tubular and is installed at least on an end face along the outer circumference of the armature. The heat-conducting element projects over the end face of the armature. In this manner, the heat-conducting element enlarges the heat-dissipating surface of the armature. A tubular heat-conducting element of this type can also include impeller-like heat-conducting surfaces. They also increase the heat-conducting surface of the armature. The additional, impeller-like surfaces can be located, e.g., on the outer circumference of a tubular heat-conducting element in the axial direction.

In a preferred embodiment, the electrical machine can include a housing, a stator, an armature with armature grooves for accommodating an armature winding, and a fan wheel for cooling the electrical machine. The armature and the fan wheel are non-rotatably supported on an armature shaft. In particular, the fan wheel is located on the end face of the armature facing away from the commutator. In particular, the fan wheel is located on the armature shaft directly next to the armature. The fan impellers face the armature. When the fan wheel rotates, it generates an air flow which flows axially through the electrical machine. The air flow is produced by drawing cold air into the interior of the housing from the outside via inlet openings located on the side of the armature facing away from the fan wheel. After the cooling air has flowed axially through the electrical machine, the heated air is dissipated to the outside via outlet openings located, e.g., near the fan wheel.

In the preferred embodiment, the fan wheel is connected with the armature in a thermally conductive manner via at least one heat-conducting element. Via the heat-conducting connection of the armature with the fan wheel using at least one heat-conducting element, the surface of the armature—which serves as a cooling surface—is enlarged considerably, since the fan wheel—in addition to the heat-conducting element—acts as a dissipator. As a result of the increased heat dissipation, higher motor output is attained with the same volume of air, i.e., with the same fan wheel diameter.

At least one heat-conducting element is provided, which is connected with the armature and the fan wheel in a thermally conductive manner. The fan wheel and the heat-conducting element are made of a material with good thermally conductive properties, e.g., aluminum or sheet steel. The design of the armature preferably includes an armature laminated core. The connection between the heat-conducting element and the fan wheel, and between the heat-conducting element and the armature must also be thermally conductive in design.

In one embodiment, the heat-conducting element is integral with the fan wheel. This has the advantage that the heat-conducting element need not be manufactured as a separate component and in a separate working step with the fan wheel.

In an alternative embodiment, the fan wheel includes recesses in which the heat-conducting element engages, to connect the heat-conducting element with the fan wheel. To this end, suitable connecting elements such as pegs can be provided on the heat-conducting element, which are inserted in matching recesses in the fan wheel.

In a further embodiment, the heat-conducting element is bonded with the fan wheel using a thermally conductive material, e.g., a thermally conductive adhesive mass.

The various types of connections of the heat-conducting element with the fan wheel and with the armature can also be combined, of course. For example, the heat-conducting element can engage in recesses of the armature and also be connected therewith in a bonded manner, e.g., using a thermally conductive adhesive mass.

In a simple embodiment, the heat-conducting element which connects the armature with the fan wheel can be a pin, a segment, or the like. Several heat-conducting elements in the form of pins, segments, or the like can also be provided, which are distributed evenly over the surface of the armature, for example. The pins, segments, or the like can be provided as individual heat-conducting elements and can be connected individually with the fan wheel and the armature. Several pins, segments, or the like can also be connected with each other, e.g., via an annular element. This can make it easier to attach the pins, segments, or the like to the fan wheel and the armature, and it can enlarge the heat-dissipating surface.

According to a further embodiment, the heat-conducting element is designed as a sleeve which is non-rotatably mounted on the armature shaft. The sleeve, which is made of thermally highly conductive material, is located directly on the armature shaft and is, e.g., pressed or inserted under the armature onto the armature shaft. The sleeve is so long that it extends below the armature on the end face of the armature facing the fan wheel and can be connected with the fan wheel in a thermally conductive manner, e.g., via pressing, screws, or adhesion. As an alternative, the sleeve can also be integral with the fan wheel. In this case, the sleeve is also fastened under the armature to the armature shaft.

In a further embodiment, the heat-conducting element is tubular and is connected with the outer circumference of the armature. The tubular heat-conducting element can be integral with the fan wheel. Or, it can be inserted into an annular recess of the fan wheel. It is also possible to mount the tubular heat-conducting element on the fan wheel using a heat-conducting material, e.g., a resin or an adhesive mass. The diameter of the tubular heat-conducting element is selected depending on the outer diameter of the armature. For example, the heat-conducting element can be slid onto the armature on the end face of the armature facing the fan wheel, and can be connected with the armature, e.g., in a bonded manner using an adhesive mass. A tubular heat-conducting element enlarges the heat-dissipating surface considerably.

The various embodiments of heat-conducting elements can be used individually or in combination.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
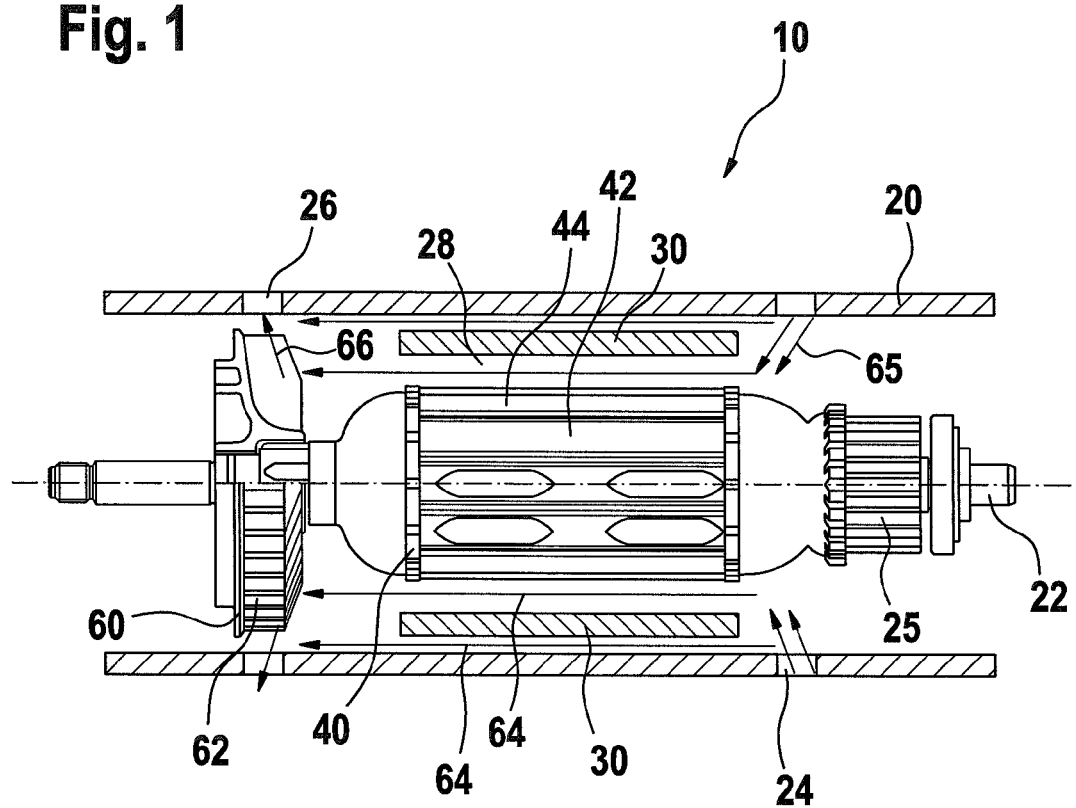
FIG. 1 shows an electrical machine according to the related art, in a longitudinal sectional view

FIG. 1 shows an electrical machine 10 according to the related art, in a longitudinal sectional view Only those components of electrical machine 10 which are essential to the present invention will be described below. Electrical machine 10 includes a housing 20 in which a stator 30 is non-rotatably located. An armature 40 with armature teeth 44 and armature grooves 42 located between them for accommodating an armature winding (not shown) is non-rotatably mounted on an armature shaft 22. A commutator 25 is also mounted non-rotatably on armature shaft 22, on an end face of armature 40.

A fan wheel 60 for cooling electrical machine 10 is also mounted non-rotatably on armature shaft 22, on the other end face of armature 40. The fan wheel includes fan impellers 62 which face armature 40. To produce an axial air flow (indicated via arrow 64 in FIG. 1) in electrical machine 10, inlet openings 24 are provided in housing 20 near the end face opposite fan wheel 60, and outlet openings 26 are provided near the end face of armature 40 facing fan wheel 60. When fan wheel 60 rotates, air (indicated via arrow 65 in FIG. 1) is drawn into housing 20 from the outside through inlet openings 24, and is blown out of housing 20 through outlet openings 26 (indicated via arrow 66 in FIG. 1). Axial air flow 64 flows through stator 30 and air gap 28 between stator 30 and armature 40. The cooling air flows along the surface of armature 40. Electrical machine 10 can be a universal motor, for example, and include a stator 30 with a field winding (not shown).

Figure 2:
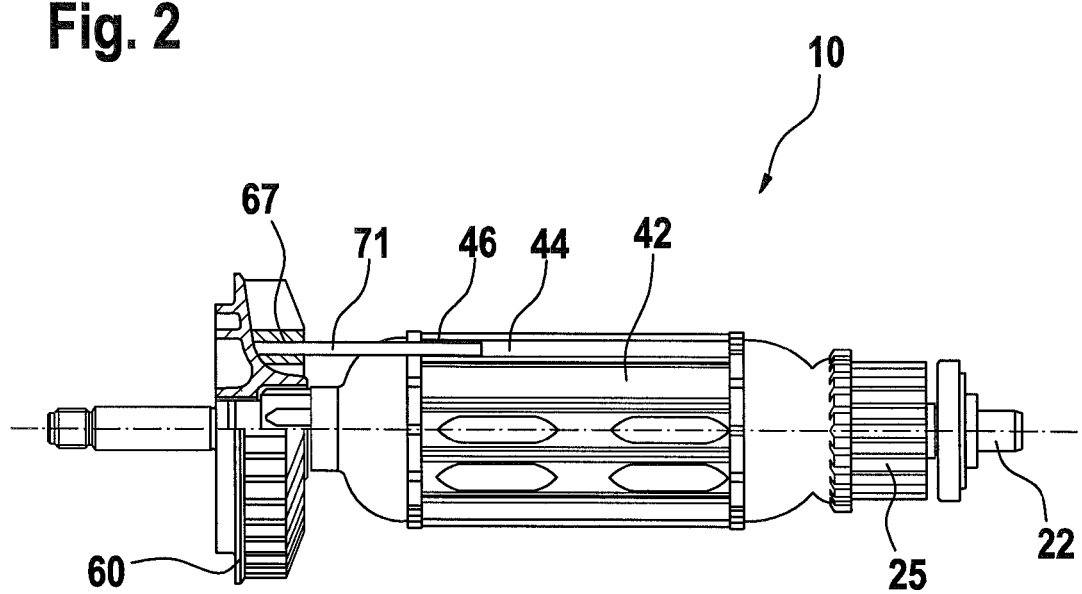
FIG. 2 shows a first embodiment of the inventive electrical machine, in a longitudinal sectional view
Figure 3:
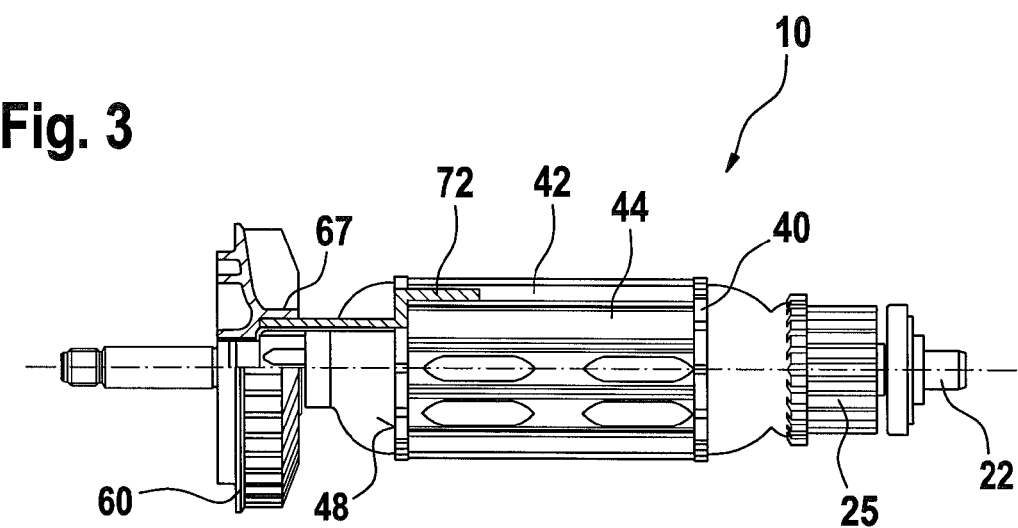
FIG. 3 shows a second embodiment of the inventive electrical machine, in a longitudinal sectional view
Figure 4:
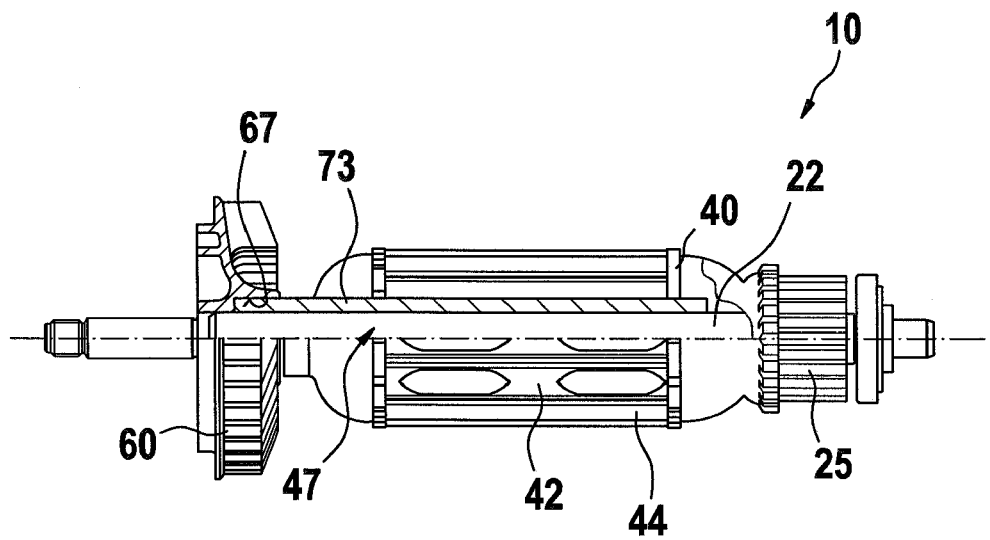
FIG. 4 shows a third embodiment of the inventive electrical machine, in a longitudinal sectional view
Figure 5:
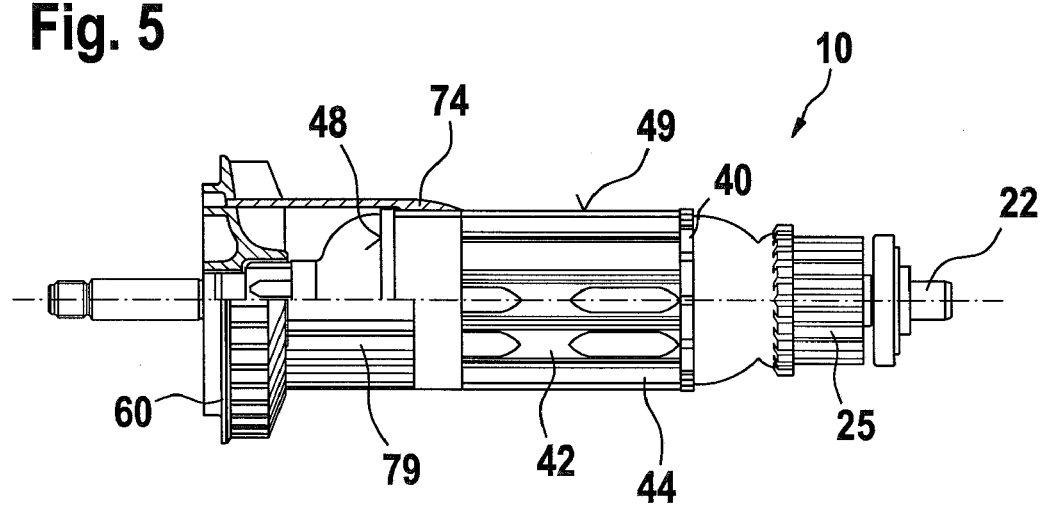
FIG. 5 shows a fourth embodiment of the inventive electrical machine, in a longitudinal sectional view

In FIG. 2 and in subsequent FIGS. 3 through 5, identical or similar components are labelled with the same reference numerals as in FIG. 1. In addition, only those components which are essential to the present invention are shown in FIG. 2 and in subsequent FIGS. 3 through 5.

FIG. 2 shows a first embodiment of a heat-conducting element in the form of a pin 71. Pin 71 is connected in a thermally conductive manner with fan wheel 60 and armature 40. Fan wheel 60 includes a recess 67 for accommodating pin 71. Armature 40, which is composed of an armature laminated core, also includes a recess 46 for accommodating pin 71. Recess 67 in fan wheel 60 and recess 46 in armature 40 can be bore holes, for example. Recess 46 in the armature can located, e.g., near an armature tooth, in particular the tooth shaft or tooth crest (not shown). Heat-conducting pin 71 therefore connects armature 40 with fan wheel 60 and forms a heat bridge which carries heat away from armature 40 to fan wheel 60. Pin 71—as is fan wheel 60—is made of a thermally highly conductive material, e.g., aluminum or sheet steel. Pin 71 can be designed with any cross-sectional shape or with any diameter. Advantageously, several pins 71 are distributed over the surface of armature 40. Pins 71 can be connected individually with fan wheel 60 and armature 40, or they can be connected with each other, e.g., via a ring.

A second embodiment of a heat-conducting element is shown in FIG. 3. This is a peg 72 which is connected in a thermally conductive manner via engagement—in a recess 67—with fan wheel 60. Peg 71 is connected in a thermally conductive manner with armature 40 by inserting it into an armature groove 42 before an armature winding (not shown) is installed. Peg 71 is therefore located at the base of armature groove 42. On end face 48 of armature 40, peg 71 is U-bent toward armature shaft 22 and extends essentially along or parallel with armature shaft 22 toward fan wheel 60 until peg 71 engages in recess 67. Peg 71 therefore also serves as a heat bridge and carries heat away from armature 40 to fan wheel 60. Several pegs 71 can also be provided, each of which is inserted in an armature groove 42.

Heat-conducting elements, which are inserted in armature grooves 42 as is peg 71, according to FIG. 3, are particularly advantageous, because it is not necessary to provide recesses 46 in armature 40 to create a thermally conductive connection with armature 40. With a thermally conductive element such as peg 71, the magnetomotive force of armature 40 is therefore not disturbed by the engagement of the heat-conducting element in recess 46 of armature 40. In addition, heat-conducting elements such as peg 71 do not make the winding procedure unnecessarily difficult when the windings are inserted in armature grooves 42.

FIG. 4 shows a third embodiment of a heat-conducting element in the form of a sleeve 73. Sleeve 73 is made of a thermally highly conductive material. It is installed directly on armature shaft 22, e.g., it is pressed or inserted thereon. To establish a thermally conductive connection, sleeve 73 engages in a recess 67 of fan wheel 60 and can be connected with fan wheel 60, e.g., via pressing, bonding, or screws. It can also be integral with fan wheel 60 (this design is not shown). Sleeve 73 also extends along armature shaft 22, preferably along the entire length of armature 40. Armature 40 is therefore not mounted directly on armature shaft 22, but rather on sleeve 73. Central opening 47 of armature 40 therefore accommodates armature shaft 22 and sleeve 73.

A further, fourth embodiment of a heat-conducting element is shown in FIG. 5. Heat-conducting element 74 is tubular. It is integral with fan wheel 60. Together with fan wheel 60, tubular heat-conducting element 74 forms a pot-shaped configuration. Tubular heat-conducting element 74 is connected with armature 40 in a thermally conductive manner in that it bears against or rests on outer circumference 49 of armature 40. Accordingly, the inner diameter of tubular heat-conducting element 74 is essentially the same as the outer diameter of armature 40, at least at its open end near the armature. The open end of tubular heat-conducting element 74 therefore accommodates at least a portion of armature 40 near end face 48 which faces fan wheel 60.

Heat-conducting element 74 is fastened to armature 40, e.g., using a heat-conducting adhesive mass. Tubular heat-conducting element 74 can form a closed surface, or it can include axial slots 79. The particular advantage of a tubular heat-conducting element 74 is the fact that it enlarges the heat-dissipating surface considerably. The surface of tubular heat-conducting element 74 can also be enlarged by using a profiled surface instead of a smooth surface. A profiled surface can include, e.g., ribs, which can have any type of cross sectional design, e.g., rectangular, triangular, or undulating. As an alternative, to enlarge the surface even further, a tubular heat-conducting element 74 can be provided which does not have a cross section which is smooth and round, but which is undulating, zigzagged, or the like.

Figure 6:
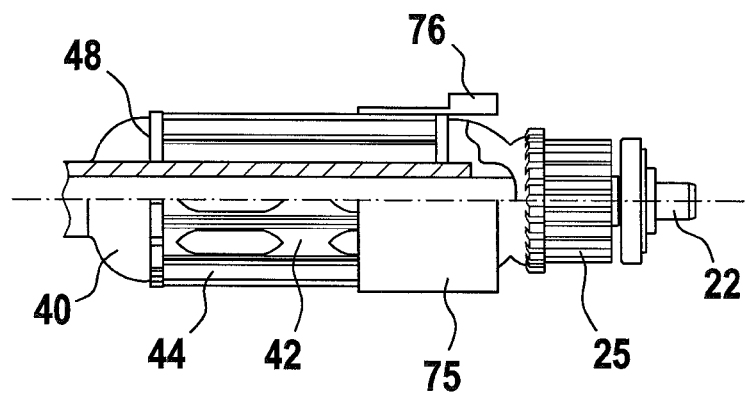
FIG. 6 shows a further embodiment of an armature with a heat-conducting element.

FIG. 6 shows a further embodiment of a heat-conducting element which is connected with the armature. A tubular heat-conducting element 75 is provided on end face 48 of armature 40 which faces commutator 25, tubular heat-conducting element 75 being slid or inserted onto armature 40. Similar to tubular heat-conducting element 74 depicted in FIG. 5, tubular heat-conducting element 75 has a round cross section with an inner diameter which essentially corresponds to the outer diameter of the armature, so that heat-conducting element 75 rests around the outer circumference of the armature. A partial sectional view of heat-conducting element 75 is shown in FIG. 6. A simple tubular heat-conducting element 75 is shown in the lower half, while axially located, impeller-like, heat-conducting surfaces 76 are shown in the top half. Heat-conducting element 75 can be fastened to the armature, e.g., via bonding, in a manner similar to heat-conducting element 74.

It will be understood that each of the elements described above, or two or more together, may also find a useful application in other types of constructions differing from the type described above.

While the invention has been illustrated and described as embodied in electrical machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrical machine, comprising:
   an armature shaft;
   an armature winding;
   an armature provided with armature grooves for accommodating said armature windings and non-rotatably supported on said armature shaft;
   at least one heat-conducting element provided in a region of at least one end face of said armature provided for conducting heat away from said armature; and
   a fan wheel which is non-rotatably supported on said armature shaft and is connected with said armature in a thermally conductive manner via said at least one heat-conducting element, wherein said armature has an armature recess and said fan wheel has a fan wheel recess, wherein said armature and said fan wheel have a common axis and said heat-conducting element is radially spaced from said common axis of said armature and said fan wheel, and wherein said heat-conducting element has opposite end portions inserted in and extending through said armature recess and said fan wheel recess in heat-conductive contact with said armature and said fan wheel at a location radially spaced from said common axis of said armature and said fan wheel.

2. An electrical machine as defined in claim 1, wherein said heat-conducting element is configured so that it is bonded with said armature using a heat-conducting material.

3. An electrical machine as defined in claim 1, wherein several said heat-conducting elements are provided in the region of said at least one face of said armature.

4. An electrical machine as defined in claim 3, wherein said heat-conducting elements are configured as elements selected from the group consisting of pins and segments.

5. An electrical machine as defined in claim 1, wherein said heat-conducting element is configured as a sleeve and is non-rotatably mounted on said armature shaft.

6. An electrical machine as defined in claim 1, wherein said heat-conducting element is configured as a tube and connected with an outer circumference of said armature.

7. An electrical machine, comprising:
   an armature shaft;
   an armature winding;
   an armature provided with armature groove for accommodating said armature windings and non-rotatably supported on said armature shaft;
   at least one heat-conducting element provided in a region of at least one end face of said armature provided for conducting heat away from said armature;
   a fan wheel, wherein said fan wheel is non-rotatably supported on said armature shaft and is connected with said armature in a thermally conductive manner via said at least one heat-conducting element, wherein said at least one heat-conducting element is formed integrally with said fan wheel, and
   wherein said armature has an armature recess and said fan wheel has a fan wheel recess, wherein said armature and said fan wheel have a common axis and said heat-conducting element is radially spaced from said common axis of said armature and said fan wheel, and wherein said heat-conducting element has opposite end portions inserted in and extending through said armature recess and said fan wheel recess in heat-conductive contact with said armature and said fan wheel at a location radially spaced from said common axis of said armature and said fan wheel.

* * * * *